United States Patent [19]

Richard et al.

[11] Patent Number: 5,626,164

[45] Date of Patent: May 6, 1997

[54] CRACK RESISTANT VALVE PLATE ASSEMBLY FOR A MOLTEN METAL SLIDE GATE VALVE

[75] Inventors: Francois N. Richard, Nancy, France; Patrick D. King, Rantoul, Ill.

[73] Assignee: Vesuvius Crucible Company, Wilmington, Del.

[21] Appl. No.: 510,418

[22] Filed: Aug. 2, 1995

[51] Int. Cl.$^6$ ........................................ F16L 7/00
[52] U.S. Cl. ..................... 137/375; 222/600; 251/144
[58] Field of Search ................. 222/600; 137/375; 251/144

[56] References Cited

U.S. PATENT DOCUMENTS

| | | | |
|---|---|---|---|
| 4,508,241 | 4/1985 | Bauer et al. | 222/600 |
| 4,524,956 | 6/1985 | Bachmann | 222/600 |
| 4,728,013 | 3/1988 | Winkelmann et al. | 222/600 |
| 4,840,296 | 6/1989 | Otsuka et al. | 222/600 |
| 5,062,554 | 11/1991 | Sakai et al. | 222/600 |
| 5,388,733 | 2/1995 | Richard | 222/600 |
| 5,431,374 | 7/1995 | Janssen et al. | 222/600 |
| 5,470,048 | 11/1995 | Taira et al. | 222/600 |
| 5,482,192 | 1/1996 | Sato et al. | 222/600 |

FOREIGN PATENT DOCUMENTS

| | | | |
|---|---|---|---|
| 040340 | 11/1981 | European Pat. Off. | 222/600 |
| 56141961 | 4/1980 | Japan | 222/600 |
| 61-38773 | 2/1986 | Japan | 222/600 |
| 61-33773 | 2/1986 | Japan | 222/600 |
| 61-159260 | 7/1986 | Japan | 222/600 |
| 61-159262 | 7/1986 | Japan | 222/600 |
| 63-154247 | 6/1988 | Japan | 222/600 |
| 62-202769 | 6/1989 | Japan | 222/600 |
| 241768 | 2/1990 | Japan | 222/600 |
| 5115964 | 5/1993 | Japan | 222/600 |
| 5200531 | 8/1993 | Japan | 222/600 |

OTHER PUBLICATIONS

Kurosaki Refractories Co., Ltd.

*Primary Examiner*—Denise L. Ferensic
*Assistant Examiner*—Joanne Y. Kim
*Attorney, Agent, or Firm*—Sixbey Friedman Leedom & Ferguson; Thomas W. Cole

[57] ABSTRACT

A crack resistant valve plate assembly is provided for use in a slide gate valve. The valve plate assembly includes a refractory valve plate having an orifice positioned along its longitudinal center line, and truncated corners for focusing a clamping force toward the center line in the vicinity of the orifice to prevent the formation and spreading of cracks. The angular orientation of each of the truncated corners varies with respect to the position of the orifice along the longitudinal center line. Specifically, each of the truncated corners are orthogonal to a line extending from a point tangent with the orifice, across the center line, and through an intersection lines drawn parallel to the converging lengthwise and widthwise plate edges that is spaced from the edges a distance equal to one-half of the maximum diameter of orifice that the plate can effectively operate with.

15 Claims, 6 Drawing Sheets

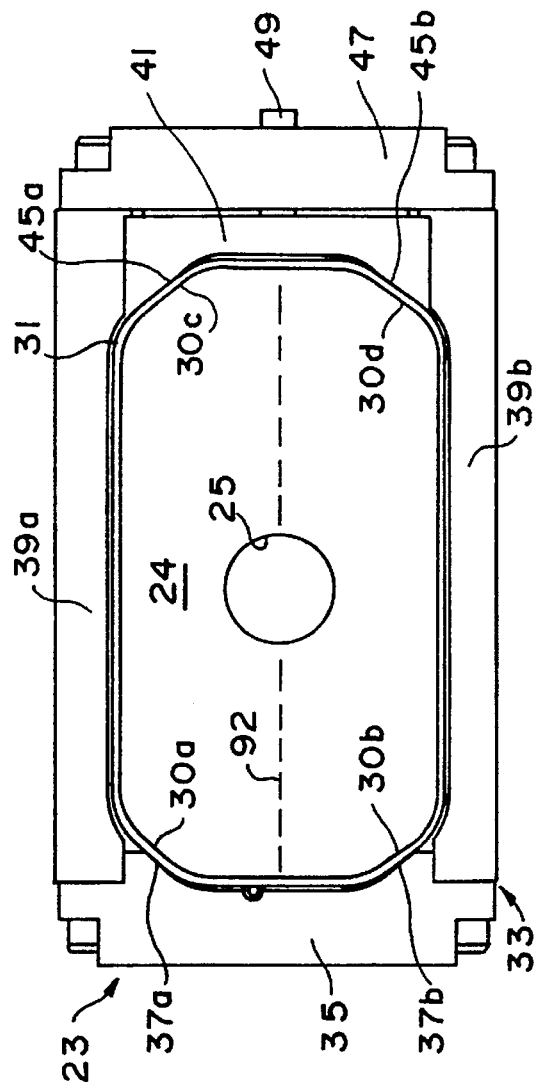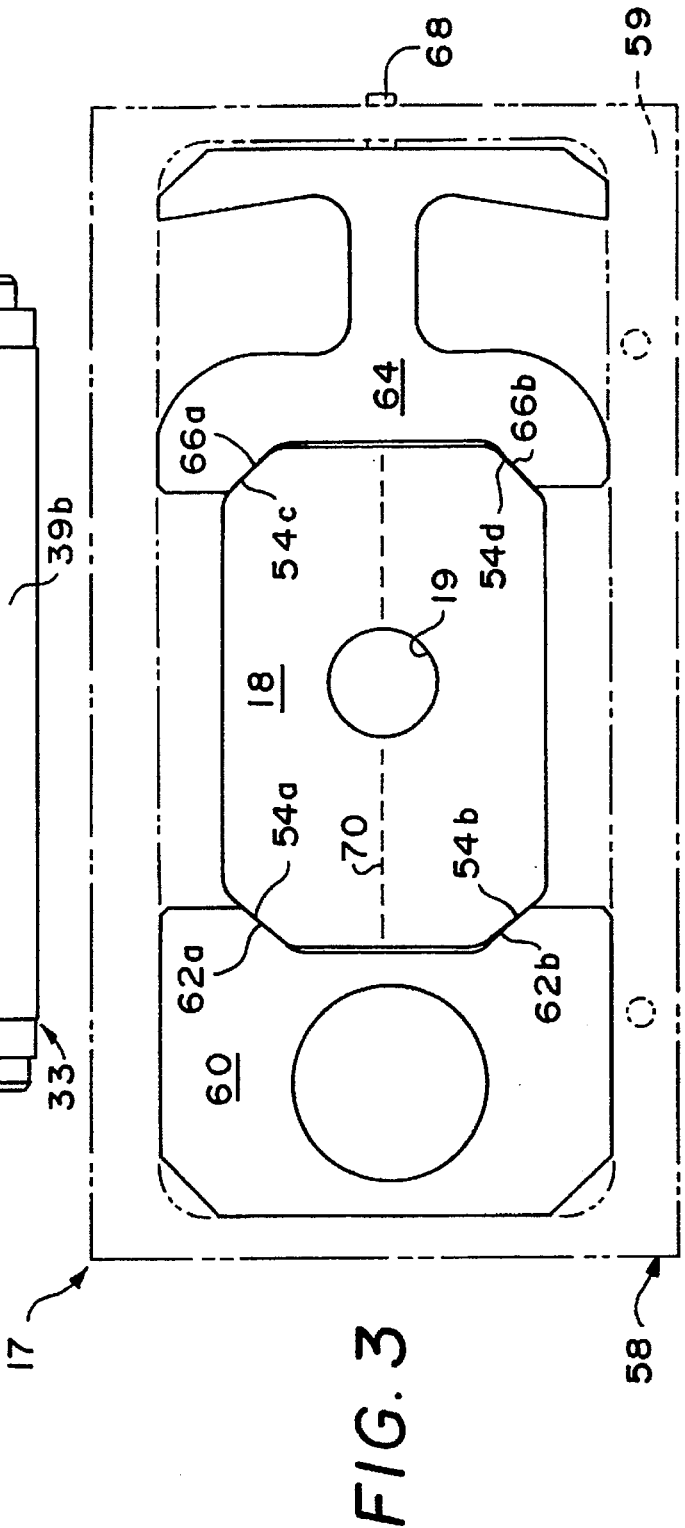

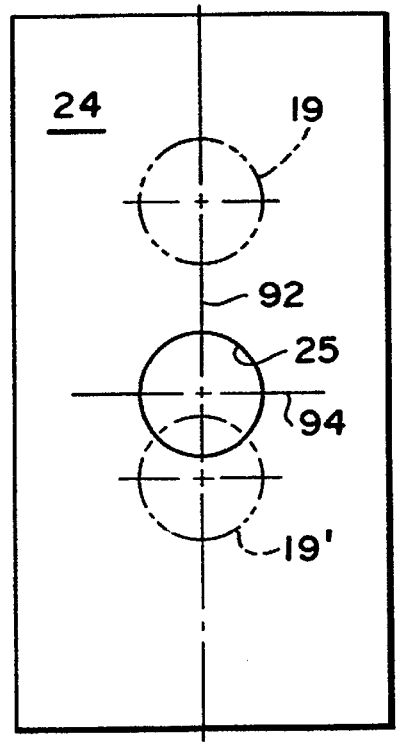
FIG. 11
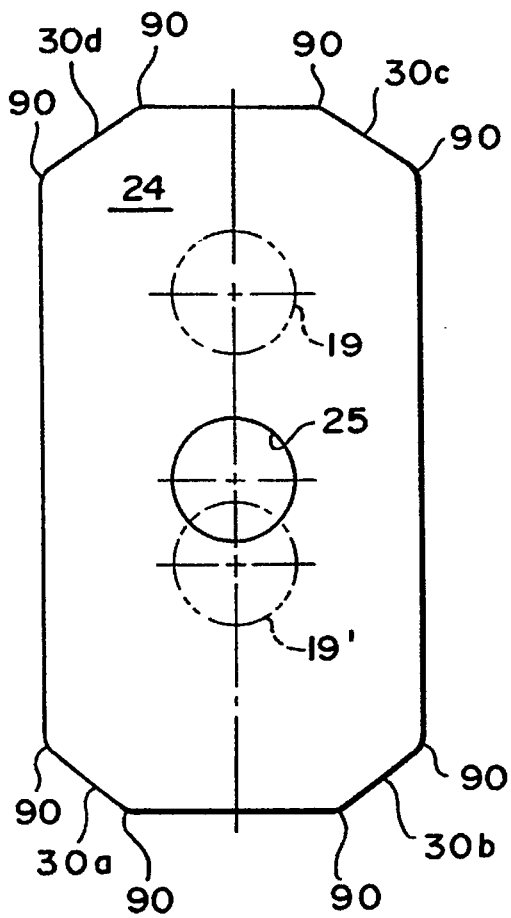
FIG. 12
FIG. 13
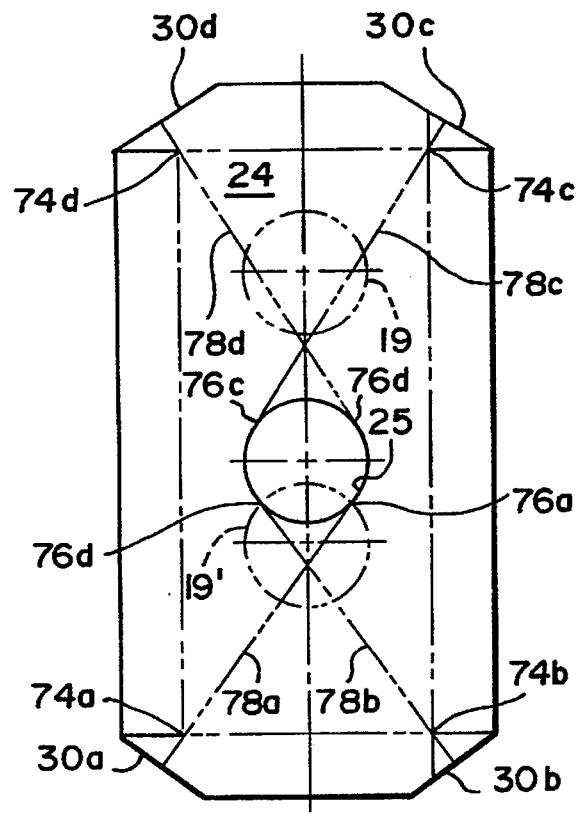

CRACK RESISTANT VALVE PLATE ASSEMBLY FOR A MOLTEN METAL SLIDE GATE VALVE

BACKGROUND OF THE INVENTION

This invention generally relates to valve plates for use in slide gate valves for controlling a flow of molten metal, and is specifically concerned with a valve plate assembly that is resistant to cracks caused from thermal stresses.

Slide gate valves are commonly used to control a flow of molten metal in steel making and other metallurgical processes. Such valves comprise a support frame, an upper stationary valve plate having an orifice in registry with a tundish or ladle nozzle for conducting a flow of molten metal, and a throttle plate likewise having a metal conducting orifice that is slidably movable under the stationary valve plate. In slide gate valves used in conjunction with continuous casting molds, a lower stationary valve plate is provided beneath the movable throttle plate which likewise has a flow conducting orifice that is substantially aligned with the orifice of the upper stationary plate. The rate of flow of molten metal is dependent upon the degree of overlap of the orifice of the slidably movable throttle plate with the orifice of the upper stationary plate. The movable throttle plate is usually longer than the stationary throttle plates in order to give it the capacity of throttling the flow of molten metal from both the front and back edges of its own orifice, as well as the ability to shut off the flow altogether by bringing its orifice completely outside of any overlap with the orifices of the stationary plate. Typically, the throttle plate is slidably manipulated between the stationary plates by means of a hydraulic linkage.

Both the throttle plate and the stationary plates of such slide gate valves are formed from heat and erosion resistance refractory materials, such as aluminum oxide, alumina-carbon, zirconium oxide. However, despite the heat and erosion resistance of such refractory materials, the severe thermal stresses that they are subjected to ultimately causes some degree of cracking to occur. For example, in steelmaking, each valve plate is subjected to temperatures of approximately 2900° in the area immediately surrounding its flow-conducting orifice, while its exterior edges are experiencing only ambient temperature. The resulting large thermal gradient creates large amounts of mechanical stress as the area of each plate immediately surrounding its orifice expands at a substantially greater rate than the balance of the plate. These stresses cause cracks to form which radiate outwardly from the orifice of the plate. If nothing is done to contain the spread of these cracks, they can extend all the way to the outer edges of the plate, causing it to break.

To prevent the spreading of such cracks and the consequent breakage of the valve plates, various clamping mechanisms have been developed in the prior art. The purpose of these mechanisms is to apply sufficient pressure around the perimeter of the plate so that cracks emanating from the orifice do not spread to the edges of the plate. In one such mechanism, a steel band is stretched around the perimeter of each of the valve plates. Unfortunately, the applicants have observed that there are at least three disadvantages associated with the use of such band-type clamping mechanisms. First, because the steel that forms such bands is a superior thermal conductor to the air that would otherwise surround the plate edges, the use of a steel band actually increases the thermal gradient across the lengthwise and widthwise axes of plate, thereby encouraging even more cracking to occur. Secondly, as the steel band heats up as a result of being in the vicinity of molten metal, it expands much faster than the refractory material forming the valve plates, which in turn causes it to relax the compressive forces that it needs to apply around the plate in order to discourage the spread of cracks. Thirdly, if the corners of the plate are not rounded, such clamping bands can apply localized mechanical stresses onto the corners of the plates, which in turn can cause unwanted cracking in these areas.

To overcome these and other shortcomings, clamping systems have been developed that comprise a frame having screw-operated wedges which engage corners of the plate that have been truncated in an angle that is complementary to the angle of the wedges. While such frame and wedge type clamping mechanisms constitute a clear advance over the mere use of steel banding around the perimeter of the plates, the inventors have further noted at least two shortcomings with this design that prevent it from achieving its full, crack-retarding potential. In all of the variations of this design that the applicants are aware of, the angle of each of the truncated corners with respect to either the lengthwise or widthwise edge of the plate is the same, regardless of the position of the orifice along the longitudinal center line of the plate. Consequently, in plates where the orifice is offset along the longitudinal center line of the plate (which includes virtually all valve plates), the clamping forces cannot be uniformly focused where the maximum amount of cracking occurs, i.e., in the vicinity of the orifice where the greatest amount of thermal stresses are present. Moreover, even in instances where the orifice is centrally located in the valve plate, the applicants have observed that the angular orientation of the truncated corners in such plates does not optimally prevent the spreading of cracks, as previously thought. Such non-optimality results from the face that crack formation is not uniformly distributed 360° around the orifice, but instead is biased along the longitudinal center line of all valve plates whether stationary or movable. Such an asymmetrical distribution of cracks around the plate orifices is believed to occur as a result of the longitudinal sliding action of the throttle plate across the faces of the stationary plates. Still another shortcoming associated with prior art clamping mechanisms is their use, in some cases, of angles shallower than 20° with respect to the longitudinal edges of the plate. In addition to providing inadequate clamping forces to close up cracks along the transverse axis of the plate, the use of such shallow angles generates large localized stresses due to the large amount of compression that the clamping wedges apply to the truncated corners. Such localized stresses can result in cracking and fissuring in the corner regions of the valve plates, which is directly contrary to the overall purpose of the clamping mechanism. A final shortcoming associated with such valve plates in general is their lack of any optimization of the length of the truncated corners, or the lengths and widths of the plate with respect to the diameter of its orifice. While the corner lengths should be of a certain minimal size in order to avoid the production of unwanted localized mechanical stresses in these regions of the plate, they should not be made overly large, either.

Clearly, there is a need for a valve plate whose corners are truncated at angles that optimally focus the clamping forces in the most crack-prone areas of the plate in order to maximally retard the lengthening of any such cracks. Ideally, the corners should have a length sufficient to avoid the production of unwanted localized mechanical stresses in the corners.

SUMMARY OF THE INVENTION

Generally speaking, the invention is a crack resistant valve plate assembly for use in a slide gate valve that overcomes or at least ameliorates all of the disadvantages associated with the prior art. The assembly comprises a refractory valve plate having a orifice for conducting molten metal that is positioned along a center line of the plate, and truncated corners for focusing a clamping force toward the center line in the vicinity of the orifice to prevent the formation and spreading of cracks therein, wherein the angular orientation of each of the truncated corners varies with the position of the orifice along the center line. The assembly further comprises a clamping frame for applying the required clamping force to each of the truncated corners.

To achieve the aforementioned force focusing objective, each of the truncated corners is orthogonal to a line falling within an angle whose vertex is defined by a point tangent to the orifice diameter. One side of the angle is defined by a line extending from the tangent point across the center line, and through a point where converging edges of the plate would intersect but for the presence of the truncated corner. The other side of the angle is defined by a line extending from the tangent point across the center line, and through an intersection of lines drawn parallel to the converging plate edges that are spaced from these edges a distance equal to the orifice diameter.

In the preferred embodiment, each of the truncated corners is orthogonal to a line extending between the tangent point to an orifice having the maximum diameter that the plate can operate with, across the center line, and through an intersection of lines drawn parallel to the converging plate edges that is spaced from the edges a distance equal to one-half of a maximum orifice diameter. When the plate is rectangular in shape, each of the corners is truncated along a line that is orthogonal to the aforementioned line and which extends through an intersection of one of the parallel lines and the lengthwise edge of the plate.

The plate assembly may be movable along an axis within the slide gate valve that is coincident with its longitudinal center line, or it may be stationary with respect to the slide gate valve. In either case, the plate includes an orifice along one of its center lines, and truncated corners cut in accordance with the same geometric formula as previously described with respect to the first valve plate. In either case, a clamping frame is provided for applying the required clamping force onto the truncated corners.

In order to provide a movable valve plate assembly with all the desirable capabilities of a shut-off stroke, and front and back throttle strokes that is formed from a minimum amount of ceramic material, the plate of the movable assembly is preferably rectangular in shape, having a length of between amount 5.5 and 5.75 orifice diameters, and a width of between about 2.9 and 3.1 orifice diameters. In the preferred embodiment, the length and width of the movable plate are 5.66 and 3.0 orifice diameters, respectively. In order to provide a stationary valve plate assembly that cooperates with a moving valve plate to provide a shut-off capability, and front and back side throttle strokes, the plate of the stationary assembly is likewise preferably rectangular in shape, having a length of between about 4.5 and 4.75 orifice diameters, and a width of between about 2.9 and 3.1 orifice diameters. In the preferred embodiment the length and width of the stationary valve plate is 4.66 and 3.0 orifice diameters, respectively.

Whether movable or stationary, the valve plate assembly of the invention provides a crack-resistant valve plate having shut-off and front and back throttling capabilities with a minimum amount wasted ceramic material.

BRIEF DESCRIPTION OF THE SEVERAL FIGURES

FIG. 2 is a top plan view of the throttle plate assembly of the invention;

FIG. 3 is a top plan view of the lower stationary plate assembly of the invention;

Figure 14:
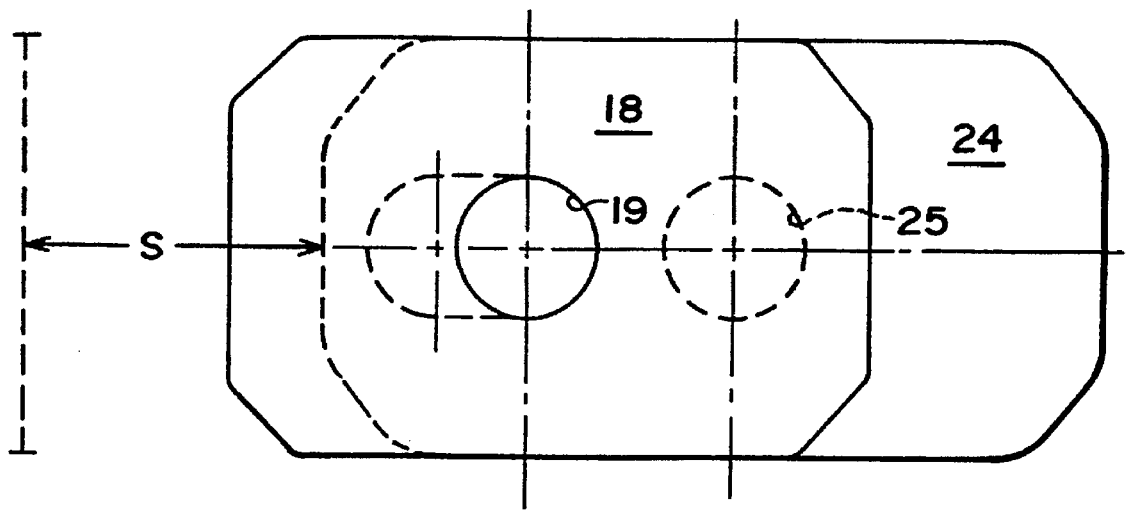
Figure 15:
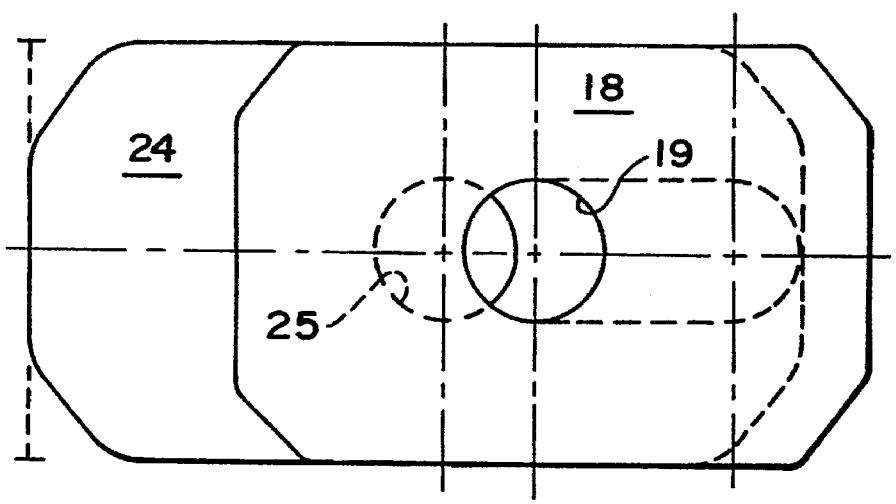

FIGS. 11, 12, and 13 are top plan view of the plate used in the throttle plate assembly, illustrating a preferable method of proportioning this plate, and how the angles of its truncated corners are determined;

FIG. 14 is a top plan view of the upper stationary plate superimposed over the throttle plate in a shut-off position, and FIG. 15 is the same top plan view of the plates illustrated in FIG. 14 wherein the throttle plate has been longitudinally slid into a back throttling position with respect to the stationary top plate.

DETAILED DESCRIPTION OF THE PREFERRED EMBODIMENT

Figure 1:
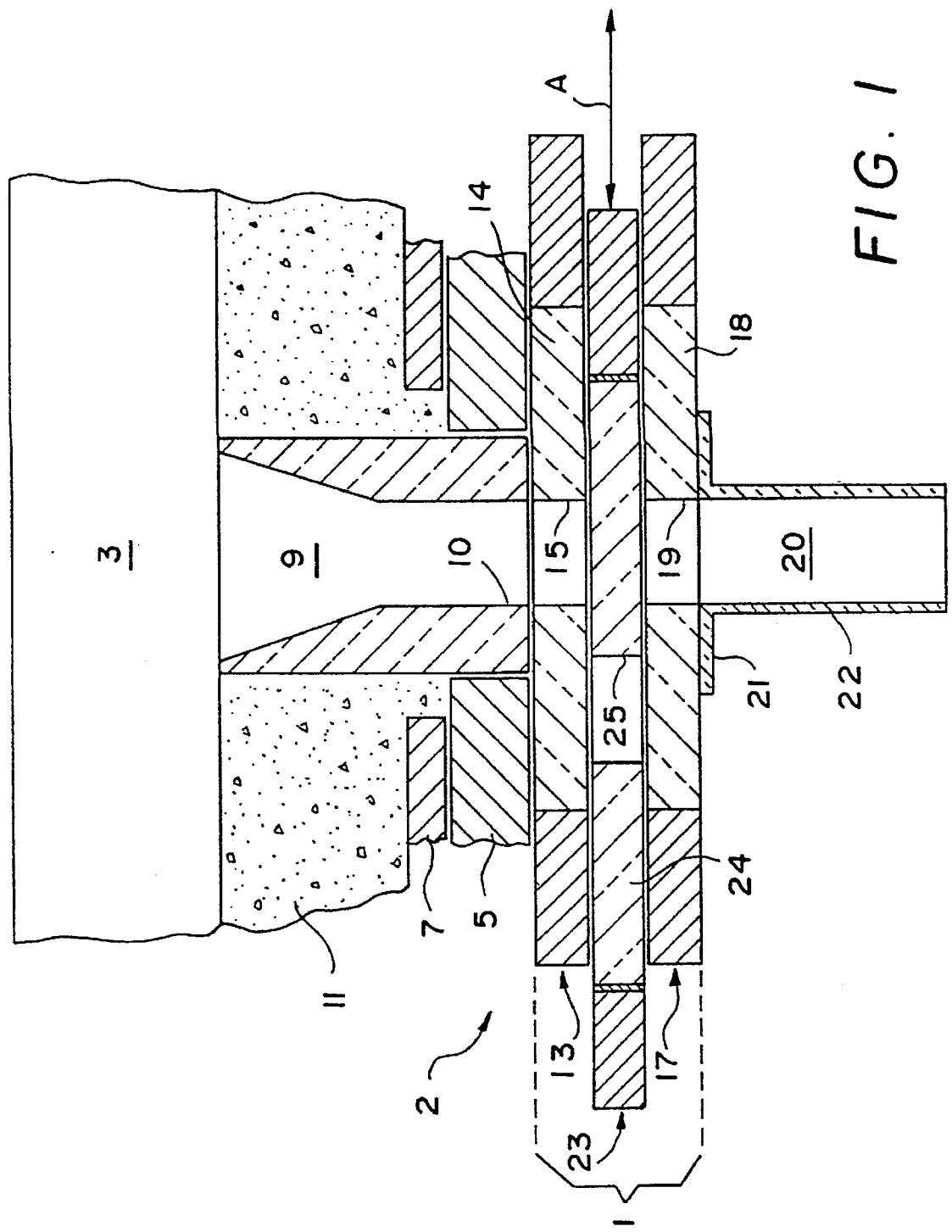
FIG. 1 is a schematized, cross-sectional side view of a slide gate valve installed in a tundish that utilizes valve plate assembly of the invention.

With reference now to FIG. 1, wherein like numbers designate like components throughout all the several figures, the invention includes both movable and stationary valve plate assemblies 1 for use in a slide gate valve 2 of the type used to regulate a flow of molten steel or other metal from a tundish 3. The slide gate valve 1 is secured onto a mounting plate 5 which in turn is connected to the tundish shell 7 by a mounting structure not illustrated. Valve 1 includes a nozzle 9 formed from a ceramic material having a funnel-shaped bore 10 for directing a cylindrically-shaped flow of molten metal out of the tundish 3. The nozzle 9 is mechanically mounted in the bottom wall of the tundish 3 by way of a packing of heat resistant, particulate ramming material 11.

The principal purpose of the valve plate assembly 1 of the invention is to modulate the flow of molten metal exiting the bore 10 of the nozzle 9. To this end, the invention includes upper and lower stationary plate assemblies 13 and 17, with a slidably movable throttle plate assembly 23 sandwiched therebetween. The upper stationary plate assembly 13 includes a stationary plate 14 of ceramic material having a circular orifice 15 for conducting a flow of molten metal from the bore 10. The lower stationary plate assembly 17 likewise has a stationary plate 18 of refractory material with an orifice 19 that is the same size as, and is concentrically aligned with the orifice 15 of the upper stationary plate 14. Preferably, both the upper and lower stationary plates 14, 18 have the same length and width. Mounted on the lower surface of the lower stationary plate 18 is a tube fixture 20 which may be used, for example, for directing a flow of molten steel into a continuous casting mold. The tube fixture 20 includes a tube mounting plate 21 that is integrally connected to a tube shroud 22. A mounting assembly (not shown) secures the plate 21 of the tube fixture 20 into the position illustrated in FIG. 1. The tube fixture 20 isolates the modulated flow of liquid metal exiting the valve plate system 1 from ambient air in order to prevent ambient oxygen from reacting with the molten metal. The throttle plate assembly 23 is slidably mounted between the upper and lower stationary plate assemblies 13 and 17. The throttle plate assembly 23 likewise includes a plate 24 formed of a ceramic material having an orifice 25 which may be circular, and the same diameter as the orifice 15 of the upper stationary plates 14. The orifice 18 of the lower stationary plate 18 is larger than that of the orifices 25 and 15 to avoid trapping steel in the throttle plate 24 during a shut-off operation. However, in order to provide the valve plate system 1 with a back edge throttling capability as well as a shut-off and front edge throttling capability, the throttle plate 23 is longer than the upper and lower stationary plates 13 and 17. During the operation of the slide gate valve 2, the throttle plate 24 is slidably and reciprocally moved by means of a hydraulic linkage (not shown) along an axis A that corresponds with the longitudinal center lines of the plates 13, 17, and 24.

With reference now to FIG. 2, truncated corners 30a–d are provided on the generally rectangularly shaped throttle plate 24 in order to focus clamping forces near the orifice 25 along the lengthwise center line 92 (which is collinear with the axis A shown in FIG. 1). A hoop of steel banding 31 is provided in tension around the perimeter of the throttle plate 24 in order to enhance the integrity of the plate. Both the plate 24 and banding 31 are surrounded by a clamping frame 33 that applies substantial compressive clamping forces to the aforementioned truncated corners 30a–d. For this purpose, the clamping frame 30 has a stationary clamping member 35 with opposing clamping feet 37a,b that are aligned at the same angle with respect to the truncated corners 30a,b on the left side of the plate 34 to avoid the generation of localized stresses. Clamping frame 33 further includes a pair of spaced apart, parallel frame legs 39 to which a movable clamping assembly 41 is attached. The assembly 41 includes a movable clamping member 43 likewise having opposing clamping feet 45a,b that are disposed at the same angle as the truncated corners 30c,d present on the right side of the plate 24. A clamping screw 49 that extends through a bore (not shown) in the clamp support member 47 threadedly engages another bore (also not shown) in the movable clamping member 43 such that, when the screw 49 is turned, the clamping feet 45a,b of the movable clamping member 43 engage the truncated corners 30c,d on the right side of the plate 34. This operation in turn causes the clamping feet 37a,b of the stationary clamping member 35 to apply clamping pressure onto the truncated corners 30a,b on the left side of the plate 24.

Since both the upper and lower stationary plate assemblies 13 and 17 are substantially identical in all salient aspects, only the lower stationary plate assembly 17 will be described in order to avoid prolixity.

With reference now to FIG. 3, the lower plate assembly 17 includes a lower stationary plate 18 having an orifice 19 which may be circular and identical in diameter to the orifice 25 of the throttle plate 24. Like the throttle plate 24, the stationary plate 18 has truncated corners 54a–d for focusing a clamping force along the longitudinal center line 70 of the plate near the vicinity of the orifice 19. The lower stationary plate assembly 17 further includes a clamping frame 58 for applying clamping forces onto the truncated corners 54a–d. To this end, the clamping frame 58 includes a rectangularly shaped frame assembly 59 (illustrated in phantom) that contains, on its left end, a stationary clamping member 60 having clamping feet 62a,b which work in the same fashion as the feet 37a,b described with respect to clamping member 35. The frame assembly 59 further contains, on its right side, a movable clamping member 64. Clamping member 64 includes clamping feet 66a,b which may be compressively engaged against the truncated corners 54c,d of the plate 18 by the turning of a clamping screw 68 that operates in the same fashion as the previously described screw 49. In all cases, the angles of the truncated corners 54a–d and the clamping feet 62a,b and 68a,b are the same so that broad area contact is made between these components, thereby avoiding localized stresses which could cause unwanted cracks in the plate 18 in the corner locations.

Figure 4:
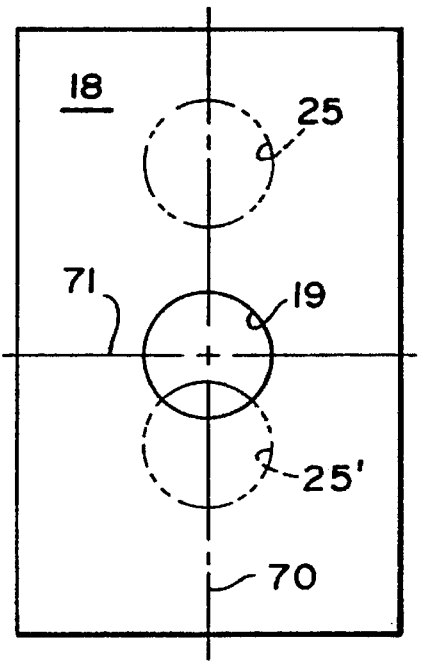
FIGS. 4 through 10 are bottom plan views of the plate used in the lower stationary plate assembly of the invention, illustrating a preferable method of proportioning this plate, and how the angles of the truncated corners are determined.

FIG. 4 illustrates how the lengthwise and widthwise dimensions of the preferred embodiments of each of the stationary plates 14 and 18 are determined as a function of the maximum diameter D of the orifice 19 that the plates can (as a practical matter) operate with. In order to accommodate a shut-off position with respect to the throttle plate 18, the length of the upper half of the plate 18 from the center point of the orifice 19 must be able to accommodate a shut-off stroke Ss of at least 1.5 orifice diameters. While it is theoretically possible for a shut-off stroke to be only a little larger than a single orifice diameter, such a sizing scheme would not take into consideration the substantial elongation that occurs of the orifice 19 along the lengthwise center line 70 of the plate 18 due to erosion. Hence, as a practical matter, the shut-off stroke must be at least 1.5 orifice diameters. Such a stroke would position the orifice 25 of the throttle plate 24 in the position illustrated in phantom on top of the plate 18. In order to have a sufficient amount of plate in the lengthwise direction to support the throttle plate 24 when it has arrives at the shut-off position illustrated in phantom, it is necessary to have an additional length D of stationary plate beyond the center point of the orifice 25, making the total length of the plate 18 from the center of the orifice 19 to be 1.5 D+1 D=2.5 D.

In determining the remaining length of the stationary plate 18 from the center of the orifice 19, it is necessary to consider only a back throttling position between the orifice 19 of the stationary plate, and the orifice 25' of the throttle plate 24 as it is not necessary for the plate 18 to accommodate two separate shut-off strokes. Accordingly, the length of the bottom half of the plate 18 is 0.66 D (which allows the throttle plate orifice 25' to arrive in the maximum back throttling position illustrated in FIG. 4) plus an additional length of plate equal to 1.5 orifice diameters so that the stationary plate 18 provides sufficient support for the throttle plate 24 within the structure of the slide gate valve 2. Hence the bottom half of the plate should be a total of 0.66 D+1.5 D=2.16 D. Combining the two halves of the plate, the total length of the stationary plate 18 (as well as the upper stationary plate 14) should be 2.16 D+2.5 D=4.66 D. In order for the stationary plate 18 to have a width sufficient within the slide gate valve 2 to have a structural strength sufficient to withstand the mechanical stresses applied to it from a stream of molten steel, and to provide adequate surface for a tube plate or a well nozzle, the width of the plate 18 should be 1.5 orifice diameters on either side from the center line of the orifice 19, making for a total width of 1.5 D+1.5 D=3.0 D. While the lengths and widths of the plates have been expressed in terms of maximum orifice diameter, the same methodology could be used to express these dimensions in terms of maximum orifice width in cases where the orifices are not circular.

Figure 5:
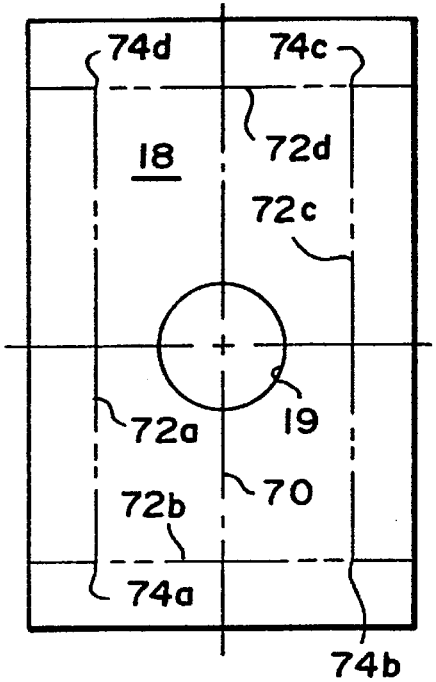
Figure 6:
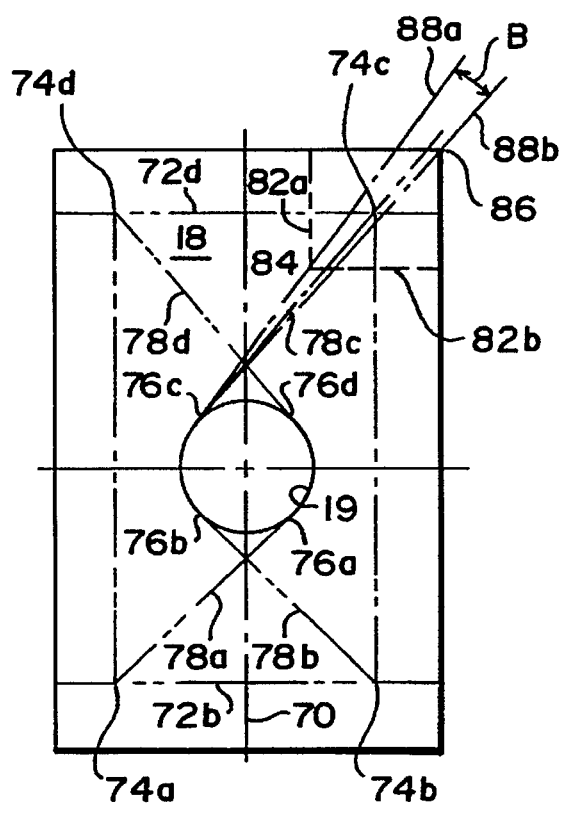
Figure 7:
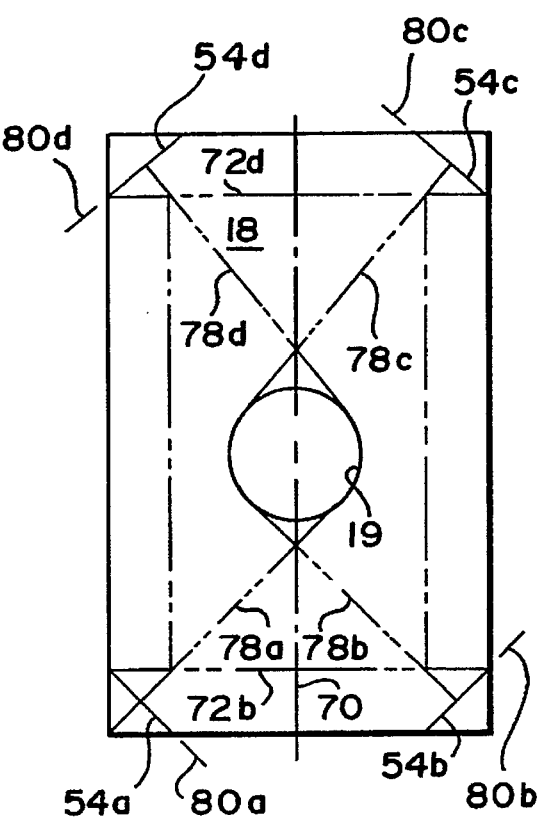

Turning now to FIGS. 5, 6, and 7, and a description of the method used in determining the angles of the truncated corners 54a–d, the first step of this angle determining method is the provision of construction lines along the inner perimeter of the plate 18 that are parallel but spaced apart from the outer edges of this plate a distance of one-half of an orifice, or 0.5 D. These construction lines are illustrated in FIG. 5 as lines 72a–d. These lines intersect at corners 74a–d as shown. FIG. 6 illustrates the next step of the angle determining method. Here, lines 78a–d are drawn between the corners 74a–d of the construction lines, and tangent points 76a–d with an orifice 19 of maximum diameter, wherein each of the lines 78a–d crosses the lengthwise center line 70. The next step of the method determines not only the angle, but the length of the truncated corners. In this step, lines 80a–d are drawn which are both perpendicular to tangent lines 78a–d and which intersect with the horizontal construction lines 72b,d. These lines 80a–d are used as guides for a corner cutting operation of the rectangular refractory plate 18 to arrive at truncated corners 54a–d.

FIG. 6 also illustrates a more generalized method whereby the angle of the truncated corners 54a–d may be determined. In this generalized method, construction segments 82a,b (each of which is one orifice diameter D in length whether the orifice used in the plate is the maximum diameter or not) are drawn at right angles to the length and width of the plate to form a square as shown. In this more generalized method step, the angle of the truncated corners 54a–d is any line falling within the angle B defined at its vertex by tangent point 76c, and on one of its sides by a line extending through the intersection 84 of the aforementioned segments 82a,b and on its other side by the intersection 86 of the converging lengthwise and widthwise edges of the plate 18 prior to truncation. Any of the lines within the angle B may be used to create a truncation angle by the construction of a line at right angle to any one of these family of lines. Each such right-angled line should extend through the intersection of the horizontal construction lines 72b,d so that the length of the truncated corners may be determined as well as the angle.

Figure 8:
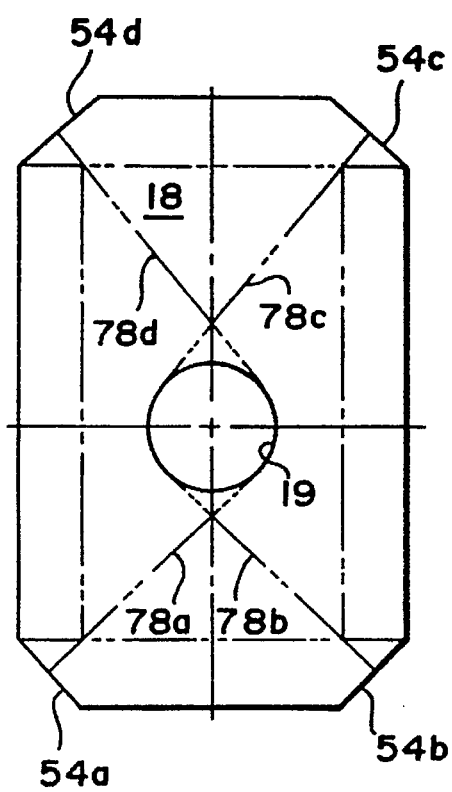
Figure 9:
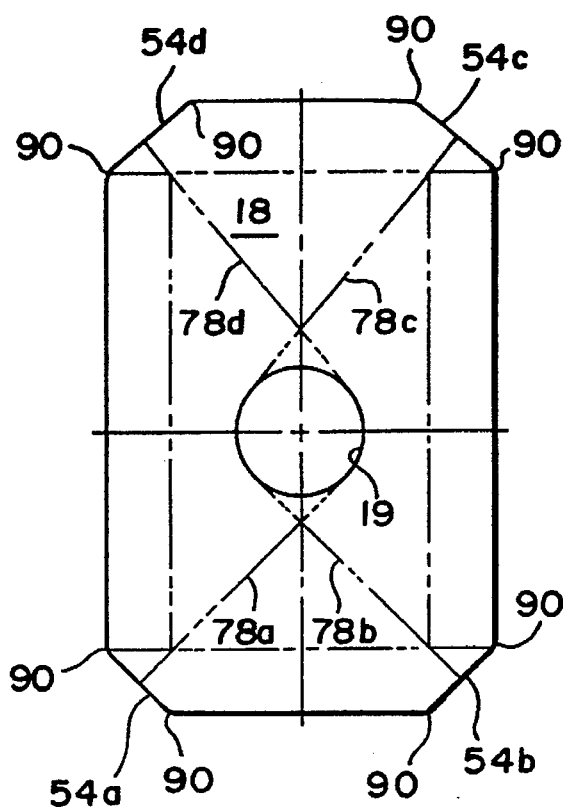

FIG. 8 illustrates a plate 18 whose corners 54a–d have been truncated in accordance with the more specific embodiment of the method, wherein lines at right angles to the tangent lines 78a–d are used to determine the specific truncation angles. After the corners have been so truncated, they are preferably radiused at their ends as 90 as is illustrated in FIG. 9. Such rounding of the corners helps to prevent the generation of localized stresses in the corner regions of the plate 18.

Figure 10:
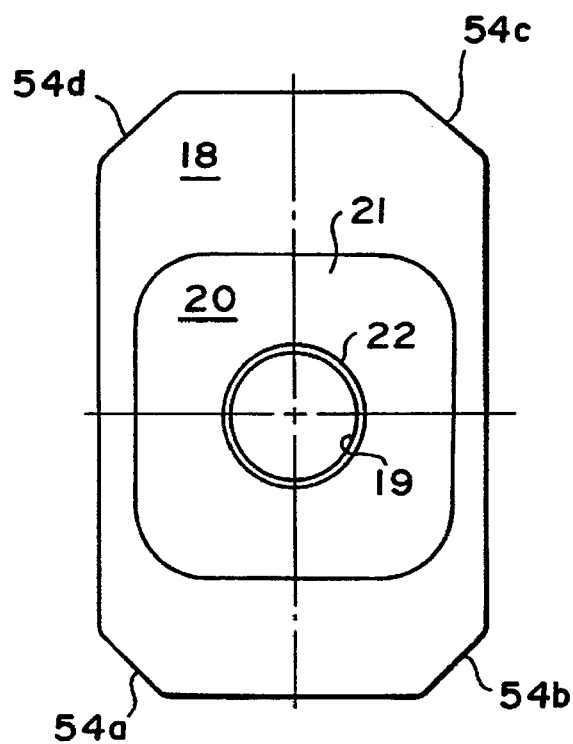

FIG. 10 illustrates the final product of the proportioning and corner truncation method of the invention. In particular, it should be noted how the 3.0 D width of the plate 18 allows it to accommodate the tube fixture 20, which has a mounting plate 21 which is 2.5 orifice diameters in both length and width.

FIGS. 11 through 13 illustrate a method that may be used to determine both the length and width proportions of the throttle plate 24 relative to maximum orifice diameters D, as well as the angle that the corners 30a–d should be truncated. With respect to the upper half of the throttle plate 24, the shut-off stroke requires, as it did in the case of the stationary plate 18, at least one and one-half maximum orifice diameters or 1.5 D. An additional 1.50 D of refractory plate must be added beyond the center of the position of the orifice 19 of the stationary plate 18 in the shut-off position to provide enough plate length for the hydraulic linkage to engage and manipulate. Accordingly, the length of the upper half of the throttle plate 24 must be 1.5 D+1.5 D=3.0 D. Turning now to the lower half of the plate 24, in order to accommodate a back throttling position, at least two-thirds of an orifice diameter or 0.66 D is required. Moreover, at least 2 diameters of length are required beyond the back throttling position, both for adequate support as well as for an adequate seal-up surface for the prevention of unwanted aspiration between the plates. Hence the total length of the bottom half of the throttling plate must be 0.66 D+2.0 D for a total of 2.66 D. Adding the upper and the lower halves of the throttle plate 24 together, the total length comes 3.0 D+2.66 D=5.66 D. The width of the plate is determined in the same manner as the stationary plate 18 for manufacturing compatibility and expediency. Accordingly, the width of the throttle plate 24 is 1.5 D+1.5 D=3.0 D.

Turning now to FIG. 13, the angle of the truncated corners 30a–d of the throttle plate 24 are determined by precisely the same methodology as described with respect to the stationary plate 18 (and in particular, FIG. 6). Accordingly, there is no need to repeat the details of this step of the method. It should be noted that, in addition to the specific method described with respect to FIG. 6 wherein the angle of the truncated corners is determined by lines constructed at right angles to the previously described tangent lines 78a–d, the generalized method step described with respect to the upper right hand corner of the plate 18 in FIG. 6 may also be applied to the corners of the throttle plate 24.

While this invention has been described in the context of a single preferred embodiment, various modifications, additions, and variations will become evident to persons of skill in the art. All such modifications, additions, and variations are intended to fall with the scope of this invention, which is limited only by the claims appended hereto.

What is claimed:

1. A crack resistant valve plate for controlling a flow of molten metal in a slide gate valve, comprising a refractory valve plate having an axis, and an orifice for conducting molten metal that is positioned along said axis, and truncated corners for focusing a clamping force toward said axis in the vicinity of said orifice to prevent the formation and spreading of cracks therein, wherein each of said truncated corners is orthogonal to a line extending between a tangent point to said orifice, across said axis, and through an intersection of lines drawn parallel to converging plate edges that are spaced from said edges a distance equal to one-half of a width of said orifice.

2. The crack resistant valve plate of claim 1, wherein each of said corners is truncated along a line that is orthogonal to said line and which extends through an intersection of one of said parallel lines and an edge of said plate.

3. A crack resistant valve plate assembly for controlling a flow of molten metal in a slide gate valve, comprising:

a generally rectangular valve plate having a longitudinal center line, said plate including a circular orifice having a center disposed on said longitudinal center line for conducting a flow of molten metal, and truncated corners for focusing a clamping force toward said center line in the vicinity of said orifice to prevent the formation and spreading of cracks therein, wherein the angular orientation of each of said truncated corners with respect to said center line varies with the position of said orifice along said center line.

4. The crack resistant valve plate assembly of claim 3, further comprising clamping frame means for applying said clamping force to each of said truncated corners.

5. The crack resistant valve plate assembly of claim 4, wherein each of said truncated corners is orthogonal to a line falling within an angle whose vertex is defined by a point tangent to said orifice, and whose one side is defined by a line extending from said tangent point, across said center line, and through a point where lengthwise and widthwise edges of said plate would intersect but for the presence of the truncated corner, and whose other side is defined by a line extending from said tangent point, across said center line, and through an intersection of lines drawn parallel to said lengthwise and widthwise edges that are spaced from said edges a distance of a diameter of said orifice.

6. The crack resistant valve plate assembly of claim 5, wherein each of said truncated corners is orthogonal to a line extending from said tangent point, across said center line, and through an intersection of lines drawn parallel to said lengthwise and widthwise edges that are spaced from said edges a distance equal to one-half of a diameter of said orifice.

7. The crack resistant valve plate system of claim 6, wherein each of said corners is truncated along a line that is orthogonal to said line and which extends through an intersection of one of said parallel lines and the lengthwise edge of said plate.

8. The crack resistant valve plate assembly of claim 3, wherein said valve plate assembly is movable within said valve along said center line, and has a length of 5.66 orifice diameters±0.1 orifice diameter.

9. The crack resistant valve plate assembly of claim 8, wherein said valve plate has a width of 3.0 orifice diameters±0.1 orifice diameter.

10. The crack resistant valve plate assembly of claim 3, wherein said valve plate assembly is stationary within said valve, and the length of the refractory plate is 4.66 orifice diameters±0.10 orifice diameter.

11. The crack resistant valve plate assembly of claim 10, wherein the width of the refractory plate is 3.0 orifice diameters±0.10 orifice diameters.

12. A crack resistant valve plate assembly for controlling a flow of molten metal in a slide gate valve, comprising a refractory valve plate having an axis, and an orifice for conducting molten metal that is positioned along said axis, and truncated corners for focusing a clamping force toward said axis in the vicinity of said orifice to prevent the formation and spreading of cracks therein, wherein an angular orientation of each of said truncated corners with respect to said axis varies with the position of said orifice along said axis.

13. The crack resistant valve plate assembly of claim 12, further comprising clamping frame means for applying said clamping force to each of said truncated corners.

14. The crack resistant valve plate assembly of claim 12, wherein said orifice is also positioned along a center line of said plate, and said truncated corners focus said clamping force toward said center line in the vicinity of said orifice.

15. The crack resistant valve plate assembly of claim 12, wherein each of said truncated corners is orthogonal to a line falling within an angle whose vertex is defined by a point tangent to said orifice, and whose one side is defined by a line extending from said tangent point, across said axis, and through a point where converging edges of said plate would intersect but for the presence of said truncated corner, and whose other side is defined by a line extending from said tangent point, across said axis, and through an intersection of lines drawn parallel to said converging plate edges that are spaced from said edges a distance equal to a width of said orifice.

* * * * *